United States Patent [19]

Teague

[11] Patent Number: 5,110,297
[45] Date of Patent: May 5, 1992

[54] ASSEMBLY SYSTEM FOR DEMONSTRATING CHEMICAL STRUCTURES

[76] Inventor: Harold J. Teague, 109 Elmhurst Dr., Lumberton, N.C. 28358

[21] Appl. No.: 297,674

[22] Filed: Jan. 17, 1989

[51] Int. Cl.[5] .............................................. G09B 29/26
[52] U.S. Cl. ...................................... 434/278; 434/279
[58] Field of Search ................. 434/277, 278, 279, 96; 446/220, 221

[56] References Cited

U.S. PATENT DOCUMENTS

| | | | |
|---|---|---|---|
| 2,922,252 | 1/1960 | Van Dam et al. | 446/221 |
| 3,080,662 | 3/1963 | Brumlik | 434/278 |
| 3,431,410 | 3/1969 | Dolan et al. | 40/614 |
| 3,509,642 | 5/1970 | Brumlik | 434/278 |
| 3,554,584 | 1/1971 | Brumlik | 287/54 |
| 3,706,139 | 12/1972 | Brumlik | 434/278 |
| 4,738,881 | 4/1988 | Lee | 428/12 |

FOREIGN PATENT DOCUMENTS

1345514 10/1963 France ................................ 434/278

OTHER PUBLICATIONS

"Follow the Bounching Balls to an Understanding of Molecular Structure", Birk—Jour. of Chem. Ed., vol. 65, Dec. 1988, p. 1055.

Primary Examiner—Edward M. Coven
Assistant Examiner—Sebastiano Passaniti
Attorney, Agent, or Firm—Bell, Seltzer, Park & Gibson

[57] ABSTRACT

An assembly for obtaining a plurality of cluster structures in either a sequential manner or collectively having a base component portion (10) having an enlarged body (12) to which is attached, by way of flexible straps (21), a plurality of assembly component portions (20) each having an enlarged body (24) and the flexible straps (21) such that, when appropriate tension is applied to the straps (21), the bodies (24) of the assembly component portions (20) are firmly abutted to the body (12) of the base component portion (10) causing rotations of the assembly component bodies (24) in relation to each other and to the base body (12) to automatically produce a plurality of cluster structures. The base component portion (10) may have the enlarged body (12) mounted on and around an enlarged hollow-core support member (11) with the member acting as a channel for the flexible straps (21).

21 Claims, 9 Drawing Sheets

ASSEMBLY SYSTEM

ASSEMBLY SYSTEM FOR DEMONSTRATING CHEMICAL STRUCTURES

BACKGROUND

1. Field of Invention

This invention relates to assembly systems, and more particularly to an assembly system that allows a plurality of cluster structures to be automatically assembled by the user, these structures being assembled either collectively or sequentially and providing the user a visual observation of interconversions of sequential structures.

More specifically, this invention is directed to an assembly system for demonstrating chemical structures.

2. Description of Prior Art

There are a large number of types of assembly sets that have been used to build models, toys and the like including chemical models. Such a set is normally provided with elements such as rods or tubes and a number of bodies such as spheres and the like that are interconnected to build the body of the structure.

Assembly sets with a plurality of elements that align in relation to each other when firmly, but flexibly, abutting increases the number and type of structures obtainable from a plurality of elements. For example, reference is made to Brumlik, U.S. Pat. No. 3,554,584, issued Jan. 12, 1971. Although this arrangement provides more flexibility than fixed angle model assemblies, which require a different set of coupling elements for each different structure to be assembled, the set must be assembled, or disassembled, by adding or removing, coupling elements to obtain each selected structure. For example, when three coupling components are assembled the user obtains a three-body structure; if a four-body structure is desired a separate forth coupling element must be added to an existing three-body structure. If the reverse process is desired, one of the coupling elements must be disassembled and removed.

SUMMARY OF THE INVENTION

It is one object of this invention to provide an assembly system for demonstrating chemical structures which is simple to use while possessing greater flexibility and utility by employing a plurality of assembly components which are coupled to a pre-existing base component yielding a single composite assembly system. Operation of such an assembly system will allow a plurality of structures to be assembled and interconverted without elements being added or removed. Thus, this system can be operated remotely, as in a corridor display. An additional benefit will be derived from such a system since the obtaining of selected structures will be coupled with the user visually observing the interconversion of a structure such as a three-body structure into a second structure such as a four-body structure.

It is a general object of my invention to provide a molecular model assembly system having a plurality of assembly component portions each comprising an enlarged body such as sphere and a flexible strap such as nylon line or the like and a base component portion comprising an enlarged body such as a sphere mounted on and around an elongated support member such as a plastic tube where the member is hollow core of sufficient diameter to allow passage of the flexible straps, and providing a means for firmly, but flexibly, abutting a plurality of assembly component portions against each other and against the base component body.

It is an object of the invention to provide an assembly system possessing a plurality of assembly component portions coupled to a base component portion which is used to obtain selected polyhedral figures, or other figures representative of chemical structures.

Another object of the invention is the provision of an assembly system of the type described in which construction of the base component portion is such that upon assembly of a plurality of assembly component portions around the base component portion a selected equiangular polyhedron may be automatically formed. For example, if three assembly component portions are, in unison, abutted against the body of the base component portion a regular tetrahedron is automatically obtained.

Still another object of the invention is the provision of a one-unit assembly system of the type described which can variably and selectively be assembled, or disassembled, by sequentially adding, or removing, assembly component portions.

Yet another object of the invention is the provision of an assembly system of the type described which allows visualization of one structure such as a three-body structure converting into a second structure such as a four-body structure.

An additional object of the invention is the provision of an assembly system of the type described which includes a plurality of spacer spheres wherein the assembly component portions may be assembled in a plurality of clustered structures to yield representations of molecules such as ethane, cyclopropane, benzene and others.

These and other objects can be achieved by my invention which provides a molecular model for demonstrating chemical structures. The model of this invention comprises a base component portion which includes a ball-like base body having a bore and a plurality of assembly component portions, each assembly component portion comprising a ball-like assembly component body attached to a strap. The straps of the plurality of assembly component portions are slidably received in the bore of the ball-like base body with all of the assembly component ball-like bodies being on the same side of the base body bore. Selective manipulation of the straps, as by pulling, provides for selective movement of selected assembly component bodies to and away from the base body thereby providing for assembly of a plurality of chemical structure-representative cluster bodies comprising the ball-like base body and selected ones of the ball-like assembly component bodies. Preferably the base component portion comprises an elongated hollow support member such as a plastic tube on which is mounted, preferably symmetrically, the base body such as a sphere; the end of the elongated support member ends at a tangent with the outer, or inner, wall of the base body. The base body is welded with glue or such to the support member to produce a composite base component portion, in the most common embodiment of the invention. A plurality of flexible straps, being part of the assembly component portions, are passed through an opening in the end of mounted body of base component portion and pass through the hollow support member, in the inventions most common embodiment.

In operation, the straps can be pulled by user, either collectively or sequentially, with sufficient tension to urge the surfaces of the assembly component portions into firm engagement with each other and with the mounted body, this being done while assembly system is being held securely, by hand or other means. If the straps are held under sufficient tension and the bodies have symmetrical surfaces, the assembly component portions are automatically arranged to produce equiangular polyhedral figures representative of chemical structures.

The enlarged i.e. ball-like, bodies, including both the base body and the assembly component bodies, although spherical in the embodiment described herein, may be ellipsoid or other shaped, may be solid or semisolid, may be rigid, semi-rigid or resilient, may be inflatable, or may be thin-walled and hollow-core. Further, a common form is for the enlarged bodies to exist as two separable sections which interconnect to produce the respective enlarged body.

BRIEF DESCRIPTION OF THE DRAWINGS

Other and further objects and advantages of the present invention will become apparent upon a study of the following specification when taken in connection with the accompanying drawings, in which:

FIG. 11 is a perspective view of the assembly system with three assembly component portions, each with an enlarged body of different color from the others, abutted to the base component portion.

FIG. 12a is a view of the assembly system of FIG. 11 taken along line 12a—12a and FIG. 12b is a view of an alternate arrangement of the assembly component portions of FIG. 12a, thereby showing that the tetrahedral structure of FIG. 11 has asymmetric, or hand-like characteristics;

FIG. 13 is a perspective view of the assembly system of FIG. 10 wherein a plurality of assembly component portions are interconnected, thereby illustrating a compound assembly component portion. This type of assembly component portion may be used to represent compound ligands in molecular structures;

Figure 1:
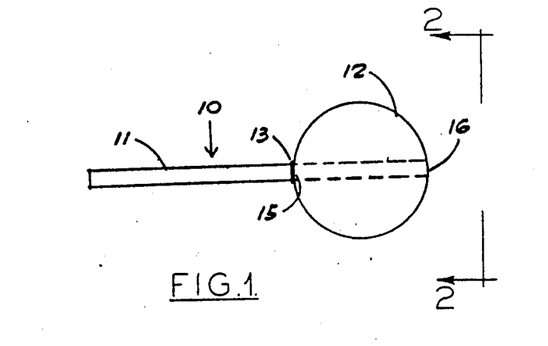
FIG. 1 is a plan view of the base component portion made in accordance with the invention and consisting of an elongated hollow-core support member with a body such as a sphere mounted symmetrically around said support.

Referring in detail to the drawings, and particularly to FIG. 1 there is shown base component portion 10 made in accordance with the present invention and comprising an elongated hollow-core support member 11 joined to enlarged body 12. In the form of the invention shown, said support member 11 is preferably molded from plastic in the form of a rigid tube; tubing suitable for this use can be purchased from a plumbing supply, and cut to size. It is to be understood, however, that support member 11 may be metal or other suitable material, may be either flexible or semi-rigid, and may be rectangular or other shape.

The base component portion 10 is constructed by boring, drilling, or molding holes 15 and 16 into each end, respectively, of said body 12 of such diameter and location as to allow the elongated cylindrical portion 11 to be snugly and symetrically placed through said body 12. Said body 12 is then welded by glue or such to said support member 11; a raised ridge or fence 13 may be included on said support member 11 and against said body 12 to ensure against slippage of said body 12 along said support member 11.

Figure 2:
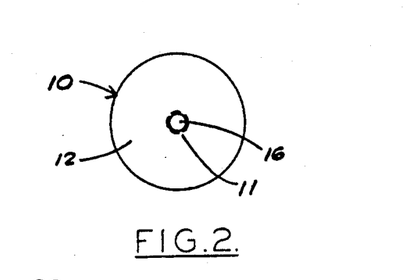
FIG. 2 is an end view of the base component portion of FIG. viewed along line 2—2.

FIG. 2 shows the base component portion 10 as it is viewed along line 1—1; as shown, the elongated member 11 fits inside a hole 16 of mounted body 12, and is tangent with outside wall. It is noted, however, that said hole 16 may be of smaller diameter than said diameter of said elongated member 11; in such an embodiment said elongated member 11 would terminate at inside wall of said mounted body 12.

Figure 3:
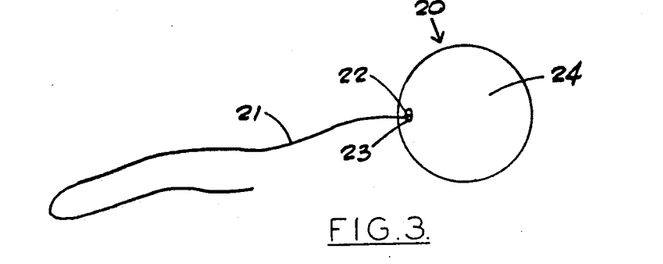
FIG. 3 is a plan view of an assembly component portion made in accordance with the invention and consisting of a body such as a sphere with an attached flexible strap such as a nylon line.

FIG. 3 shows a representative assembly component portion 20 made in accordance with the present invention and comprising a body 24, which may be identical to the mounted body 12 of FIG. 2, and a flexible strap 21. Said flexible strap 21 is attached externally by welding or other means at position 22 of said body 24 or threaded through a hole 23 in said body 24; once said strap 21 is through said body 24 it may be knotted or attached to a disc or other body to prevent passage back through said hole 23.

As an important feature of the invention said flexible straps 21 may be made of rubber or other elastomeric or stretchable material, or in the form of a spring.

In the form of the invention shown said bodies 12,24 of said base component portion 10 and plurality of said assembly component portions 20 are preferably molded from plastic as thin-walled, semi-rigid spheres. Plastic eggs, balls and other objects suitable for use as said bodies 12,24 can be purchased at a department store. It is to be understood, however, that said bodies 12,24 may be of solid construction, may be of metal or other material, or may be ellipsoid or other shape. It is especially to be understood that the plurality of bodies 12,24 may consist of various colors, and in at least one embodiment is necessary. It is also noted that said enlarged bodies 12,24 may be constructed from separable segments that are connected together to produce said bodies.

Figure 4:
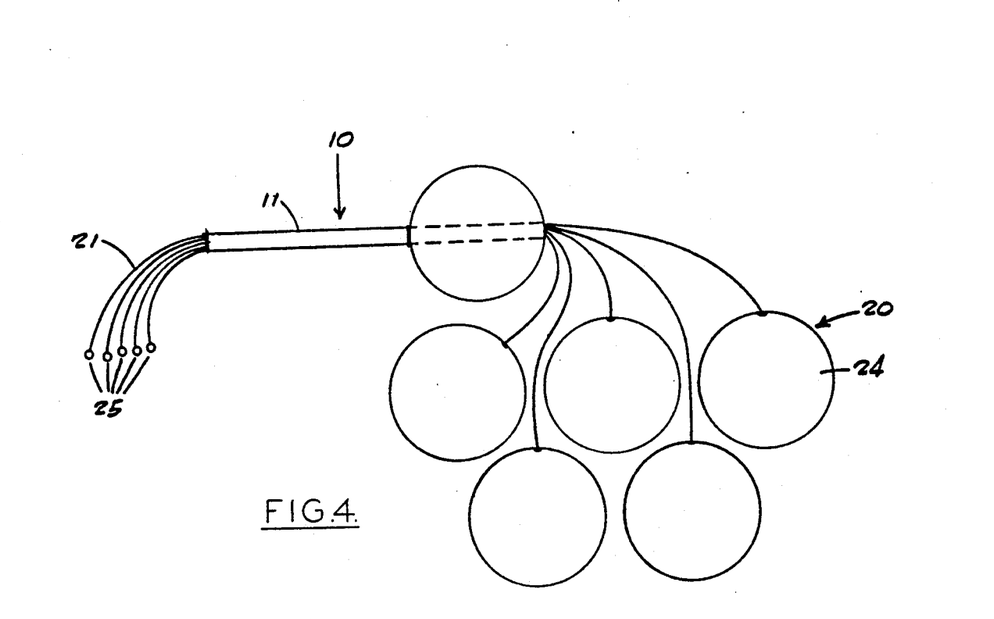
FIG. 4 is a plan view of the assembly system consisting of the base component portion with a plurality, such as five, of the assembly component portions attached by means of the flexible straps being passed through openings in the base component portion; each free end of the straps may be attached to a body of sufficient size to prevent passage of the straps back through the base component portion.

FIG. 4 shows the assembly system with five assembly components portions 20 attached and ready for operation by user. Said flexible strap 21 of each said assembly component portion 20 is shown passing through said elongated member 11 of said base component portion 10. The ends of said flexible straps 21 extending through said elongated member 11 may be attached to bodies 25 as shown to prevent disassembly of system should one or more said straps 21 become unsecured.

Figure 5:
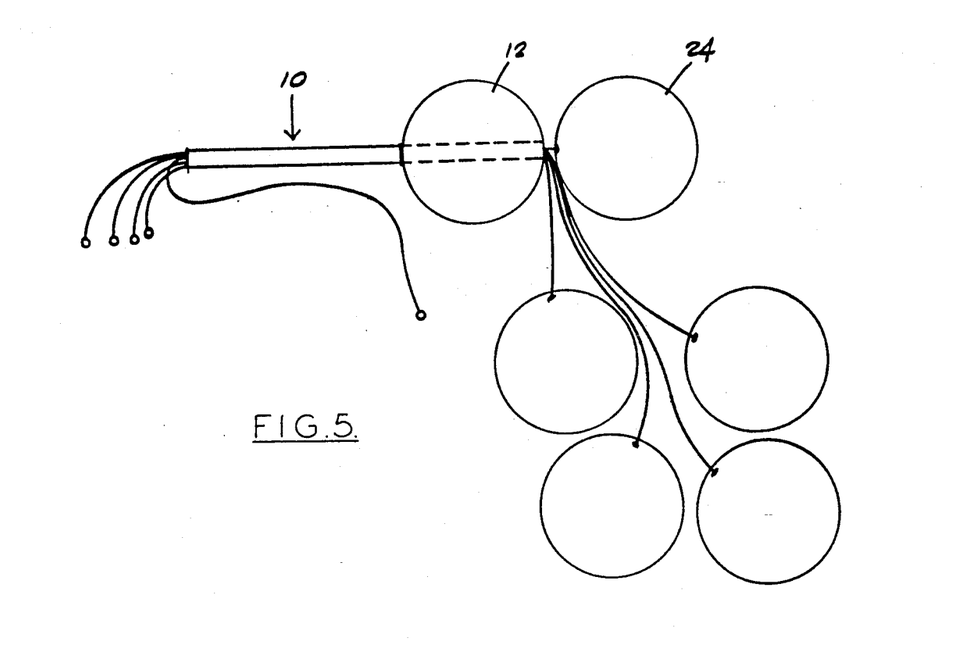
FIG. 5 is a plan view of a the assembly system with one of the assembly component portion straps held sufficiently tight to bring the attached body in firm engagement with the mounted body of the base component portion; the remaining plurality of assembly components being disengaged.

FIG. 5 shows the assembly system with one assembly component portion strap 21 held tight so that bodies 12 and 24 are drawn into firm abutment with each other, the result being linear arrangement of said two bodies.

Figure 6:
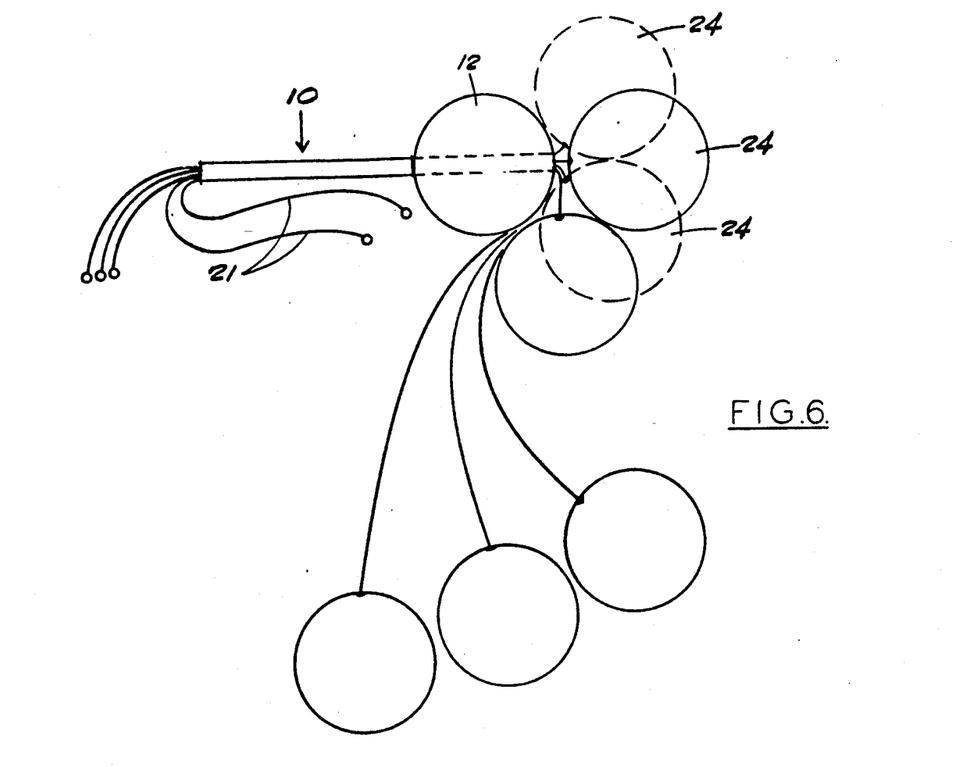
FIG. 6 is a sequence view of the assembly system showing a second assembly component portion sufficiently tight to lightly engage this component with the abutting bodies of FIG. 5 and a moved view where the second assembly component portion is sufficiently tight to bring said body in firm engagement, this view being indicated by broken lines.

FIG. 6 shows a sequence view of the assembly system in which a second assembly component portion 24 is being assembled to the linear system of FIG. 5. Initially, the strap 21 is just tight enough to bring the newly added component 24 into abutment with the pre-existing bodies, 12 and 24 of FIG. 5; if both said straps are brought under equal and sufficient tension said assembly component portions 24 will rotate upon said base component body 12 in such a manner to make all three bodies 12,24 at equal angles to each other. The final structure will be a trigonal arrangement as shown by broken lines in FIG. 6 and by the plan view of FIG. 7 below.

Figure 7:
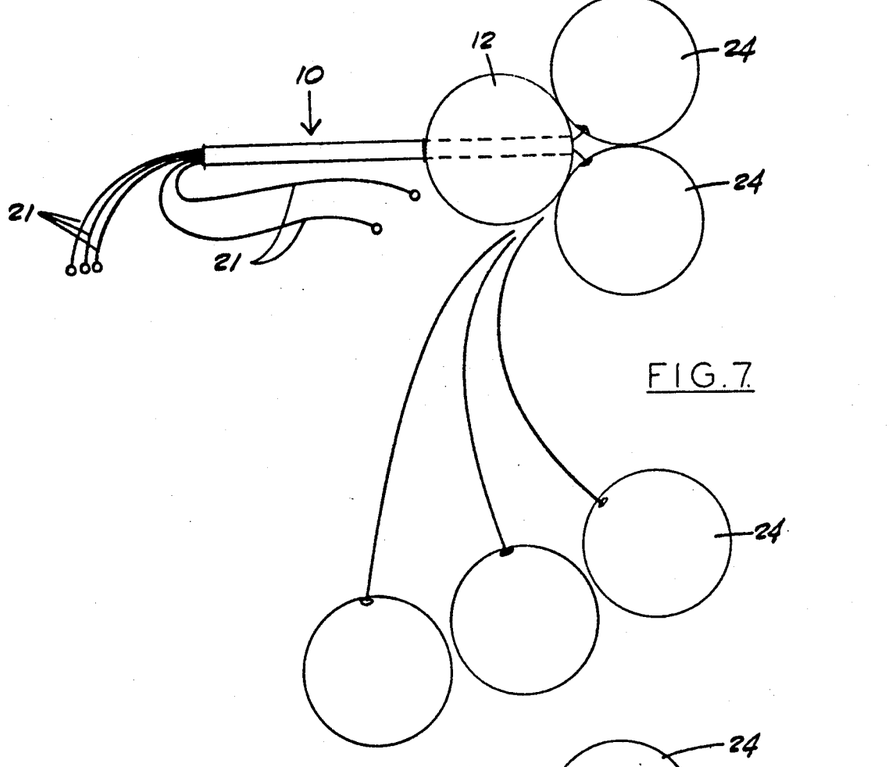
FIG. 7 is a plan view showing the moved view of FIG. 6 where the two assembly component portions are firmly engaged with each other and with the body of the base component portion.

FIG. 7 shows the assembly system with two assembly component portions 24 firmly abutting each other and the base component body 12 to produce a trigonal arrangement; the view is the same as the broken line view of FIG. 6.

Figure 8:
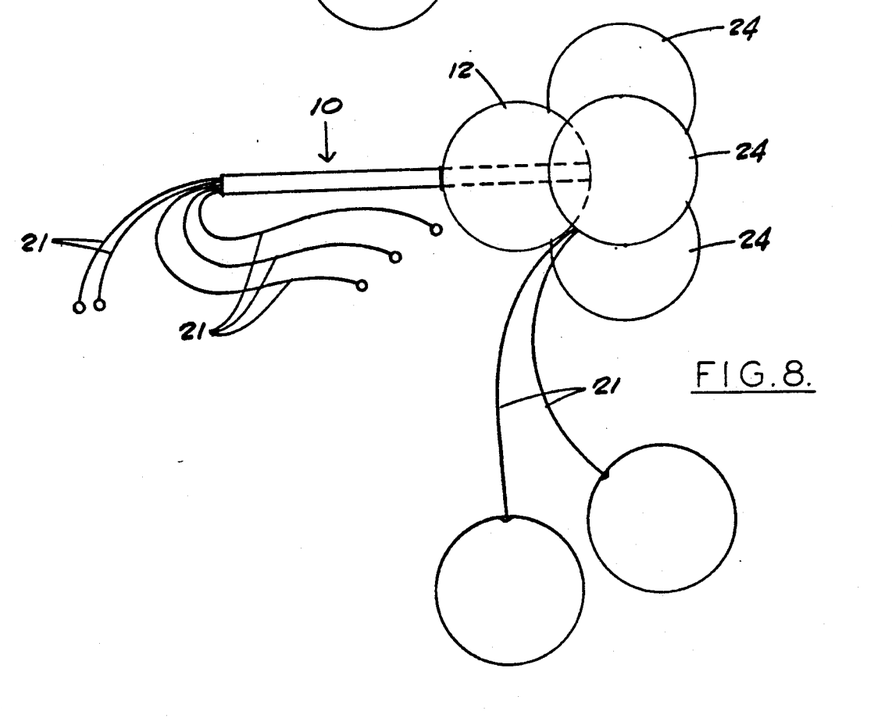
FIG. 8 is a plan view of the assembly system with three assembly component portions firmly engaged against each other and against the body of the base component portion.

FIG. 8 shows a third assembly component portion 24 assembled in the manner described above to the system of FIG. 7. If the straps 21 are sufficiently tightened, said components 24 will rotate against each other and against the base body 12 in such a manner to form a tetrahedron. Since the tension on said straps 21 may be varied by the user, the rate of conversion from the three-body structure of FIG. 7 into the four-body, tetrahedral, structure of FIG. 8 may be controlled. The visual observation of the conversion occurring has value for the user, being both dramatic and informative; the process demonstrates how mutual forces act upon bodies to determine structure.

Figure 9:
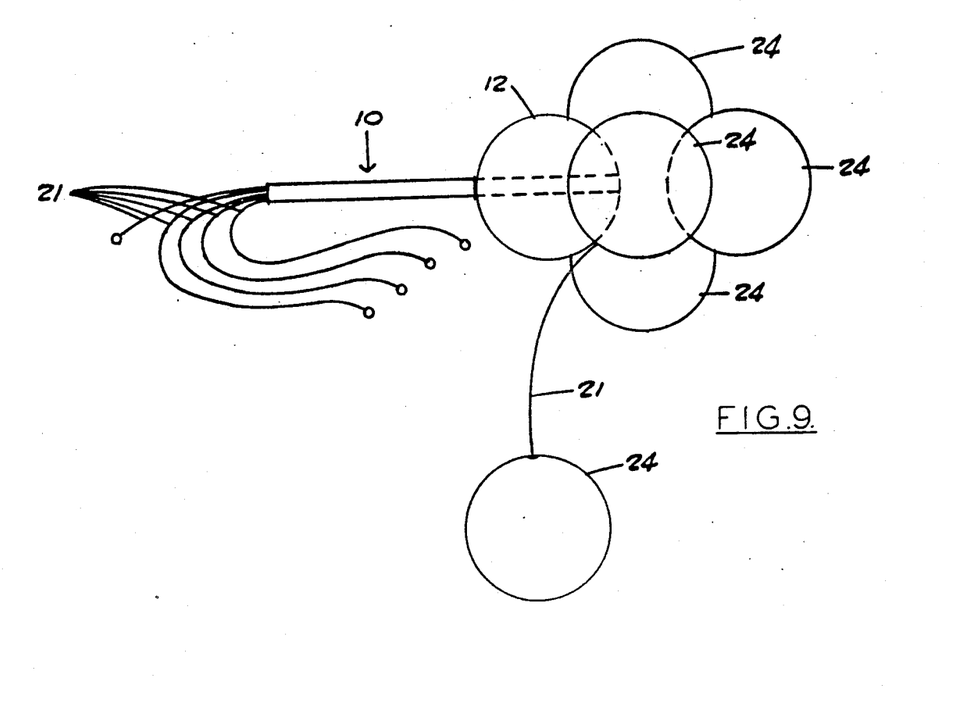
FIGS. 9-10 show plan and perspective views of the assembly system with four and five assembly component portions firmly engaged to the body of base component portion yielding, respectively, five- and six-body structures.
Figure 10:
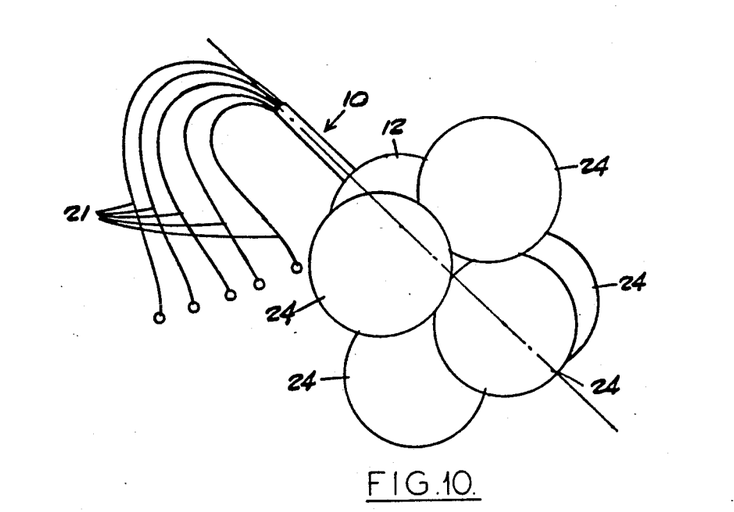

FIGS. 9–10 show the fourth and fifth assembly component portions 24 assembled, respectively, in the manner described above. If the straps 21 are sequentially tightened sufficiently the tetrahedron of FIG. 8 will convert into the trigonal bipyramidal structure of FIG. 9 as the fourth assembly component 24 is assembled, and the structure of FIG. 9 will next convert into the octahedral structure of FIG. 10 as the fifth assembly component 24 is assembled. As noted above, if the plurality of said assembly component portions 24 are assembled in unison the polyhedral structure will be obtained directly, and automatically.

While the invention has been described in the form of its most common usage, the tetrahedron of FIG. 8 has added advantages as a molecular model system in chemistry, and some of these uses will be described, which will be obvious to one skilled in the field.

Figures 11, 12A, 12B, 13:
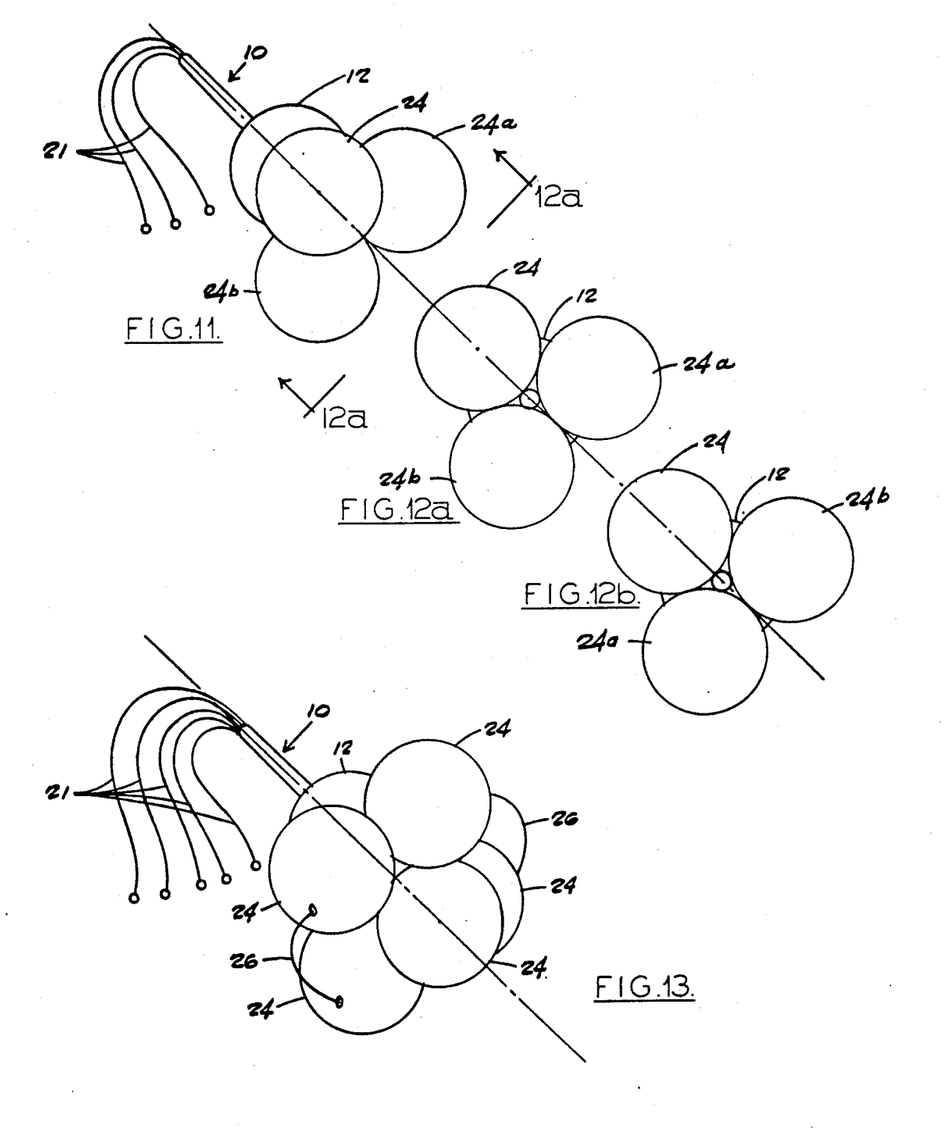

If the assembled system of FIG. 8 has the assembly component portion bodies 24 of different color as shown in FIG. 11, it may be demonstrated that two tetrahedral structures related to each other as structure and mirror-image structure may be obtained. FIGS. 11, 12a and 12b are plan views of such structures where 24a is colored black, 24b is colored blue, and 24 is some other color such as white. If tension on the strap to 24 is relaxed allowing said assembly component portion 24 to disengage a trigonal structure as shown in FIG. 7, except enlarged bodies are now colored differently, is obtained; if tension is next re-applied to said strap the tetrahedral structure of FIG. 12a will be reformed, or a structure equivalent to the mirror-image of FIG. 12a, as shown in FIG. 12b, will be formed. If the above sequence is repeated many times, structure 12a and its mirror-image structure 12b will be obtained in a random manner. That two structures may be obtained is readily demonstrated by drawing color coordinated circles to structure 12a on a chart and bringing each structure produced by above sequence up to this chart for comparison.

The tetrahedral structure of FIG. 12a may have a second white assembly component portion 24 assembled to the system from the side opposite the existing white assembly component portion 24; if said white assembly component portion 24 of pre-existing structure 12a is then disengaged a new tetrahedron is obtained, which is a mirror-image structure to 12a, that is, structure 12a will be converted into structure 12b. That the before and after structures are different may be demonstrated by comparison to a chart with color coordinated circles to 12a as above.

FIG. 13 shows connectors 26 joining the enlarged bodies 24 of two assembly component portions to yield a compound assembly component portion.

Figure 14:
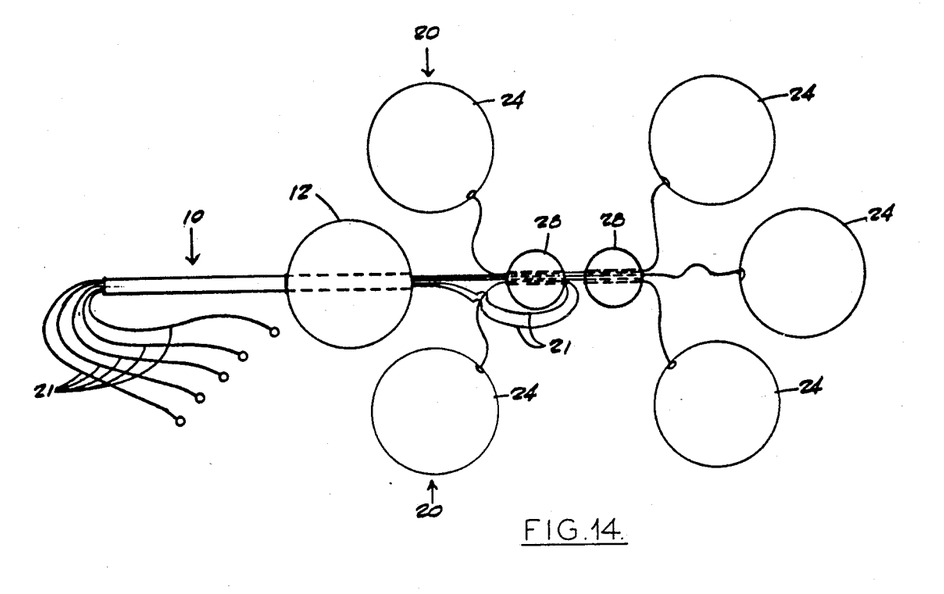
FIG. 14 is a plan view of a relaxed form of the assembly system wherein a plurality of spacer spheres are interposed between three assembly component portions and two assembly component portions and the base component portion.
Figure 15:
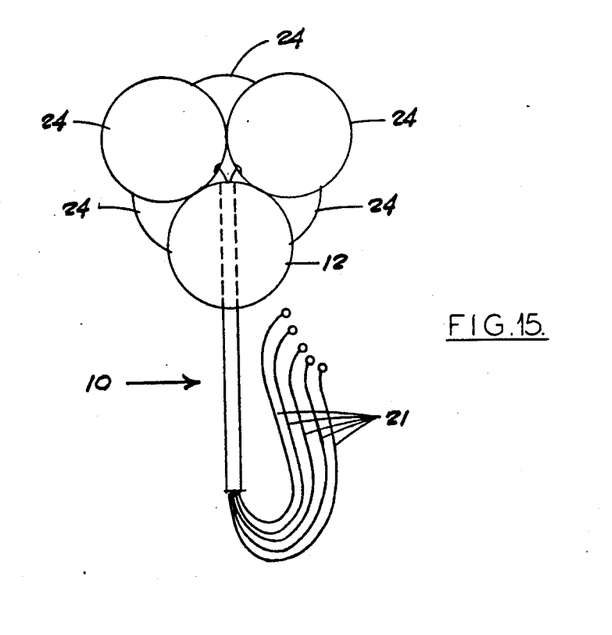
FIG. 15 is a plan view of the assembly system of FIG. 14 wherein the straps are sufficiently tightened to bring the assembly component portions, the base component portion, and the interposing spheres into firm engagement, the result being two layers of three enlarged bodies, arranged in a staggered manner. In chemistry this arrangement may be used to represent an ethane structure.

FIG. 14 shows two spacer spheres 28 interposed between two sets of enlarged bodies 24; the straps 21 of the assembly component portions 20 are looped through the bore of, and around one said spacer sphere as shown; this embodiment gives the system of FIG. 15 when tension is applied to said straps.

Figure 16:
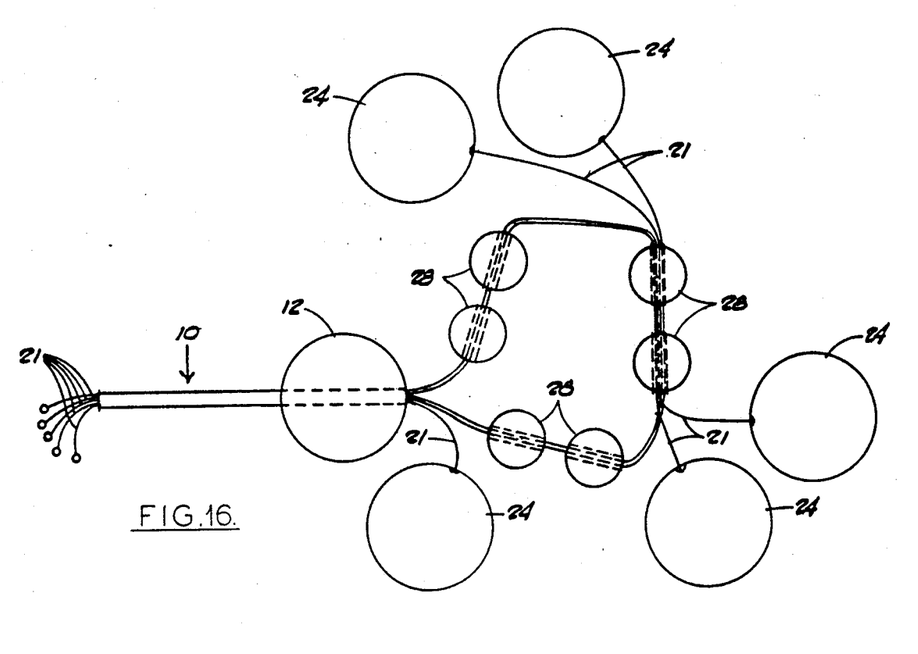
FIG. 16 is a plan view of a relaxed form of the assembly system wherein a plurality of spacer spheres are interposed between three sets of enlarged bodies, each set consisting of two enlarged bodies, and one said body comprising part of the base component portion.
Figure 17:
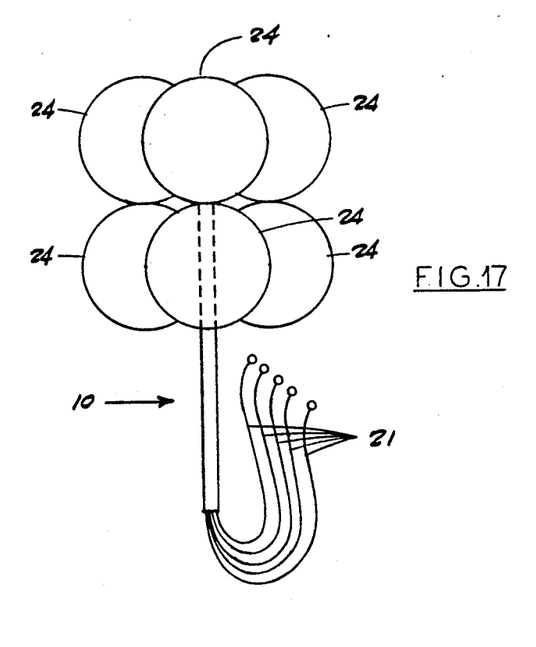
FIG. 17 is a plan view of the assembly system of FIG. 16 wherein the straps are sufficiently tightened to yield a two-layer system wherein the three two-enlarged-body sets are aligned with each other. In chemistry this arrangement may be used to represent a cyclopropane structure.

FIG. 16 shows three sets of two spacer spheres 28 interposed between three sets of two-each enlarged bodies; one of the sets of enlarged bodies comprising bodies 12 and 24 and the other two sets comprising bodies 24. The four straps 21 are looped through the same set of spacer spheres 28 so that when tension is applied the structure of FIG. 17 is obtained.

Figure 18:
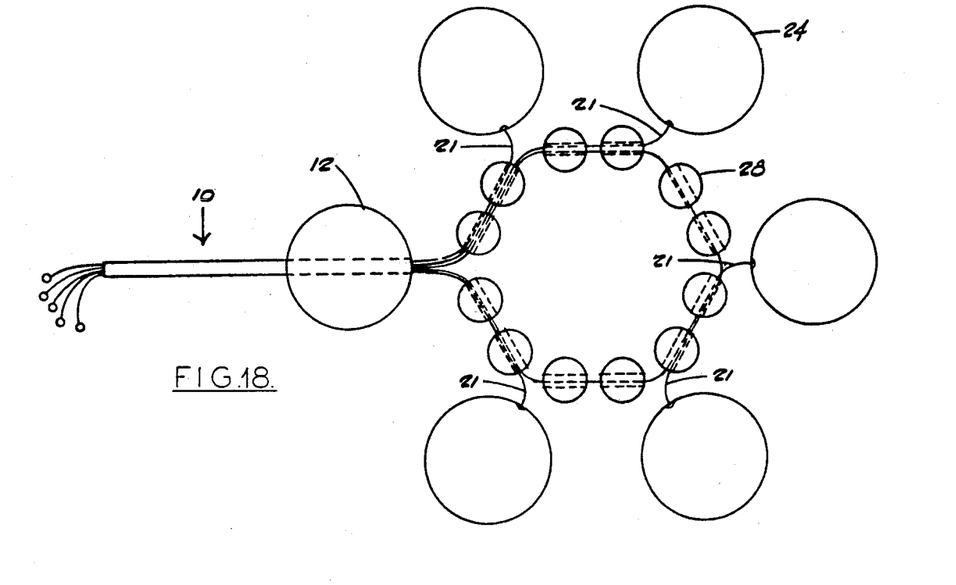
FIGS. 18-19 show plan views of a relaxed and a tightened form of the assembly system wherein six enlarged bodies, one being part of the base component portion, are arranged with a plurality of spacer spheres between each enlarged body to yield a regular hexagon-like structure. In chemistry the arrangement of FIG. 19, when supported by a level surface, may be used to represent a benzene structure.
Figure 19:
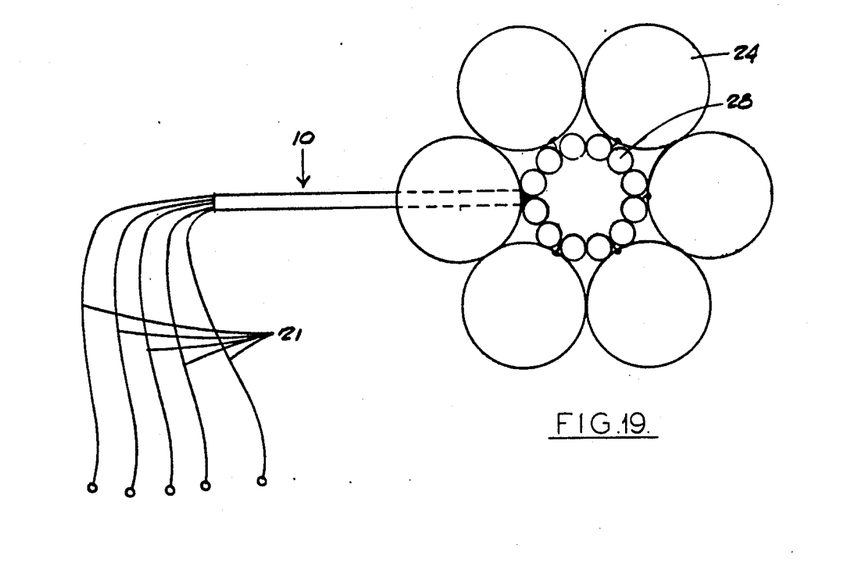

FIG. 18 shows six enlarged bodies comprising five bodies 24 and one body 12, with a set of spacer spheres 28 interposed between each said body 24,12. FIG. 19 shows the regular hexagon-like structure obtained upon assemblage of the system.

Figure 20:
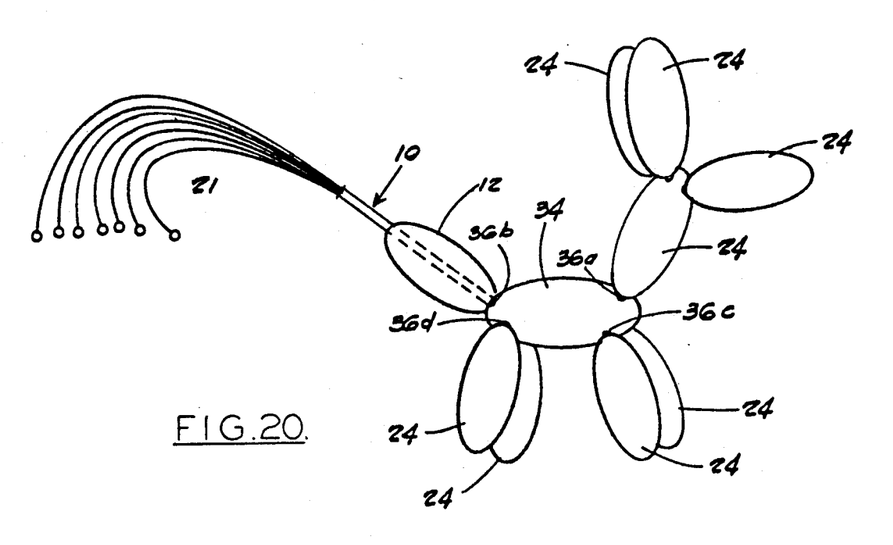
FIG. 20 is a plan view of a form of the assembly system wherein one enlarged body has a plurality of openings, or holes, strategically placed that are in addition to the holes at either end. In this embodiment the holes are placed in such a way that a structure is obtained which may be used to depict a toy animal figure, such as a dog.

FIG. 20 shows a modified enlarged body 34 with a plurality of additional openings 36a–d; flexible straps 21 are used to connect a four-body cluster through opening 36a, single enlarged bodies 24 through openings 36c and 36d, and the enlarged body 34 with attachments to the base component portion 10 at opening 36b. When appropriate tension is applied to straps 21 the structure of FIG. 20 is obtained.

Although the invention has been described with said plurality of bodies 24 of said assembly component portions 20 and said body 12 of said base component portion 10 of identical size and shape, it is noted that the size and shape of said bodies 12,24 may vary. It is easily demonstrated that if one or more of said bodies 12,24 is of different size a distorted polyhedron will be obtained.

There is thus provided by this invention an assembly system comprising a base component portion, a plurality of assembly component portions, and a plurality of spacer spheres that may be assembled in variable ways, either sequentially or collectively, to produce a plurality of structures. Additionally, the user is able to visually observe the conversion of one structure into another structure when the assembly component portions are assembled sequentially.

Although the invention has been described with reference to particular embodiments, it is to be understood that these embodiments are merely illustrative of the application of the principles of the invention. Numerous modifications may be made therein and other arrangements may be devised without departing from the spirit and scope of the invention. Accordingly the reader is requested to determine the scope of the invention by the appended claims and their legal equivalents, and not by the examples which have been given.

I claim:

1. A model for demonstrating chemical structures comprising:
   (a) a base component portion comprising a ball-like base body having a bore; and
   (b) a plurality of assembly component portions, each assembly component portion comprising a ball-like assembly component body attached to a strap at one end thereof;
   wherein the straps of the plurality of assembly component portions are slidably received in the bore of the ball-like base body with all of the assembly component ball-like bodies being on the same side of the base body bore; and
   wherein selective manipulation of the straps provides for selective assembly of a plurality of chemical structure-representative cluster bodies comprising the ball-like base body and selected ones of the ball-like assembly component bodies.

2. The model of claim 1 wherein the base component portion additionally comprises an elongated hollow-core member and wherein the ball-like base body is mounted on and around the elongated hollow-core member.

3. The model of claim 2 wherein the elongated hollow-core member is cylindrical.

4. The model of claim 2 wherein at least a portion of the elongated hollow-core member defines the bore of the ball-like base body.

5. The model of claim 2 wherein the elongated hollow-core member is adapted and arranged to act as a support for the ball-like base body by which the model may be manually or mechanically held while in operation by the user.

6. The model of claim 4 wherein the elongated hollow-core member is adapted and arranged to act as a support for the ball-like base body by which the model may be manually or mechanically held while in operation by the user.

7. The model of claim 1 wherein the ball-like base body and the ball-like assembly component bodies are spherical.

8. The model of claim 2 wherein the ball-like base body and the ball-like assembly component bodies are spherical.

9. The model of claim 1 wherein the ball-like base body and the ball-like assembly component bodies are ellipsoids.

10. The model of claim 2 wherein the ball-like base body and the ball-like assembly component bodies are ellipsoids.

11. The model of claim 1 wherein a plurality of the ball-like base body and the ball-like assembly component bodies are of different colors.

12. The model of claim 2 wherein a plurality of the ball-like base body and the ball-like assembly component bodies are of different colors.

13. The model of claim 1 wherein the straps of the plurality of assembly component portions are made of nylon.

14. The model of claim 1 wherein the straps of the plurality of assembly component portions are stretchable.

15. The model of claim 1 wherein each of the assembly component portions additionally comprises a second body, the second body being attached to the strap at the other end thereof, the second body being of greater diameter than the diameter of the bore through the base body.

16. The model of claim 11 wherein each of the second bodies are color coordinated with the assembly component ball-like body attached to the same strap.

17. The model of claim 1 additionally comprising at least one spacer body interposed between the ball-like base body and one of the ball-like assembly component bodies, wherein the strap of the assembly component portion passes through a bore in the spacer body.

18. The model of claim 17 comprising a plurality of spacer bodies interposed between the ball-like base body and the plurality of ball-like assembly component bodies.

19. The model of claim 1 wherein the ball-like base body and the plurality of ball-like assembly component bodies are all of substantially identical size and shape.

20. The model of claim 1 comprising at least five assembly component portions.

21. The model of claim 1 additionally comprising a connector joining at least two of the ball-like assembly component bodies.

* * * * *